United States Patent
Lian et al.

(10) Patent No.: US 8,704,638 B2
(45) Date of Patent: Apr. 22, 2014

(54) ELECTRONIC ARTICLE SURVEILLANCE SYSTEM WITH METAL DETECTION CAPABILITY AND METHOD THEREFOR

(75) Inventors: Ming-Ren Lian, Boca Raton, FL (US); Manuel A. Soto, Lake Worth, FL (US); Douglas A. Narlow, Coral Springs, FL (US)

(73) Assignee: Tyco Fire & Security Services GmbH, Neuhausen am Rheinfall (CH)

( * ) Notice: Subject to any disclaimer, the term of this patent is extended or adjusted under 35 U.S.C. 154(b) by 764 days.

(21) Appl. No.: 12/492,309

(22) Filed: Jun. 26, 2009

(65) Prior Publication Data

US 2010/0001872 A1    Jan. 7, 2010

Related U.S. Application Data

(60) Provisional application No. 61/134,137, filed on Jul. 7, 2008.

(51) Int. Cl.
*G08B 13/14* (2006.01)
*G08B 13/24* (2006.01)

(52) U.S. Cl.
USPC .............. 340/10.1; 340/572.2; 340/572.5; 340/572.6

(58) Field of Classification Search
USPC ............ 340/10.1, 572.2, 572.5, 572.6, 568.1
See application file for complete search history.

(56) References Cited

U.S. PATENT DOCUMENTS

| | | | |
|---|---|---|---|
| 2,337,352 A * | 12/1943 | Sitterson, Jr. et al. | 324/243 |
| 4,622,543 A * | 11/1986 | Anderson et al. | 340/572.1 |
| 4,709,213 A | 11/1987 | Podhrasky | |
| 4,791,412 A * | 12/1988 | Brooks | 340/572.2 |
| 4,821,023 A * | 4/1989 | Parks | 340/551 |
| 5,189,397 A | 2/1993 | Watkins et al. | |
| 5,414,411 A | 5/1995 | Lahr | |
| 7,019,650 B2 * | 3/2006 | Volpi et al. | 340/572.1 |
| 2007/0046288 A1 | 3/2007 | Westersten | |

FOREIGN PATENT DOCUMENTS

| | | | |
|---|---|---|---|
| EP | 0615217 A1 | 9/1994 | |
| EP | 736850 A1 * | 10/1996 | G08B 13/24 |
| EP | 0736850 B2 | 7/2003 | |

OTHER PUBLICATIONS

International Search Report dated Dec. 30, 2009 for International Application Serial No. PCT/US2009/003842, International Filing date Jun. 27, 2009 consisting of 9-pages.

* cited by examiner

*Primary Examiner* — Daniel Wu
*Assistant Examiner* — John Bamert
(74) *Attorney, Agent, or Firm* — Alan M. Weisberg; Christopher & Weisberg, P.A.

(57) ABSTRACT

A method for detecting metal using an electronic article surveillance ("EAS") system. The EAS system includes a transmitter and a receiver. An EAS interrogation signal is transmitted to establish the interrogation zone. The EAS interrogation signal is used to detect EAS markers and metal objects within the interrogation zone. The EAS signal is received and a metal object present in the interrogation zone is detected during a metal detection cycle. The metal object is detected based upon perturbations in the received EAS interrogation signal. The metal detection cycle is periodically interspersed with at least one EAS detection cycle.

13 Claims, 4 Drawing Sheets

ELECTRONIC ARTICLE SURVEILLANCE SYSTEM WITH METAL DETECTION CAPABILITY AND METHOD THEREFOR

CROSS-REFERENCE TO RELATED APPLICATION

The present invention is related to and claims priority to U.S. Provisional Patent Application No. 61/134,137, filed Jul. 7, 2008, entitled INCORPORATION OF METAL/MAGNET DETECTION MECHANISM IN ACOUSTIC EAS SYSTEMS, the entire contents of which is incorporated herein by reference.

STATEMENT REGARDING FEDERALLY SPONSORED RESEARCH OR DEVELOPMENT n/a

FIELD OF THE INVENTION

The present invention relates generally electronic article surveillance ("EAS") systems, and more specifically to a method and system for incorporating a metal or magnetic detector in an acoustic EAS system.

BACKGROUND OF THE INVENTION

Electronic article surveillance ("EAS") systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker that, when active, generates a response signal when passed through this interrogation zone. An antenna and receiver in the same or another "pedestal" detects this response signal and generates an alarm.

In acoustomagnetic ("AM") EAS systems, the key active element in the EAS marker is one or more strips of a melt-cast amorphous magnetic ribbon. When placed under a specific magnetic bias condition inside the marker, these strips receive and store magnetic field energy at its natural resonance frequency.

As a result, once the transmitted energy source from the transmitter in the detection system is turned off, the marker becomes a signal source and is capable of radiating an electromagnetic energy at its resonant frequency. Such a signal, even small can be readily detected by the receiver, due to the absence of the transmitting field.

Because of the nature of this process, other magnetic materials or metal in proximity to the EAS marker or the transmitter may interfere with the optimal performance of the EAS system. Conventional systems for detecting metals and magnetic materials are known, for example, U.S. Pat. No. 4,709,213, "Metal Detector Having Digital Signal Processing;" U.S. Pat. No. 5,414,411, "Pulse Induction Metal Detector;" and U.S. Patent Application Publication No. 2007/0046288, "Hybrid-Technology Metal Detector."

Prior systems for using metal detection with EAS systems have also been suggested generally, for example, European Patent No. EP0736850, "Method for preventing shoplifting and electronic theft detection system." However, systems such as these merely provide a metal detection system adjacent to an EAS system, but do not provide any mechanism for the increased efficiency and cost reduction of actually combining them into one system.

Therefore, what is needed is a system in which metal detection can be achieved by cohesively integrating metal detection functionality into an EAS system.

SUMMARY OF THE INVENTION

The present invention advantageously provides a method and system for detecting metal objects within an interrogation zone of an electronic article surveillance ("EAS") system. Generally, a metal object is detected using the same equipment used to detect EAS markers. Metal detection cycles and EAS marker detection cycles are periodically interspersed over time.

In accordance with one aspect of the present invention, a method is provided for detecting metal using an EAS system. The EAS system includes a transmitter and a receiver. An EAS interrogation signal is transmitted to establish an interrogation zone. The EAS interrogation signal is used to detect EAS markers and metal objects within the interrogation zone. The EAS signal is received and a metal object present in the interrogation zone is detected during a metal detection cycle. The metal object is detected based upon perturbations in the received EAS interrogation signal. The metal detection cycle is periodically interspersed with at least one EAS detection cycle.

In accordance with another aspect of the present invention, a system for electronic article surveillance includes a transmitter, a receiver and a metal detector. The transmitter is operable to transmit an EAS interrogation signal. The EAS interrogation signal establishes an interrogation zone and is used to detect EAS markers and metal objects within the interrogation zone. The receiver is operable to receive the EAS interrogation signal. The metal detector is operable to detect a metal object in proximity to the EAS system during a metal detection cycle. The metal object is detected based upon perturbations in the received EAS interrogation signal. The metal detection cycle is periodically interspersed with at least one EAS detection cycle.

In accordance with yet another aspect of the present invention, a metal detection system includes a transmitter, a receiver and a metal detector. The transmitter is operable to generate an electromagnetic signal during a transmission window. The electromagnetic signal establishes an interrogation zone and is used to detect EAS markers and metal objects within the interrogation zone. The receiver is operable to detect a signal received from an EAS marker during a detection window. The metal detector is operable to detect a metal object in proximity to the interrogation zone during the transmission window based upon perturbations in the electromagnetic signal created by the metal object.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
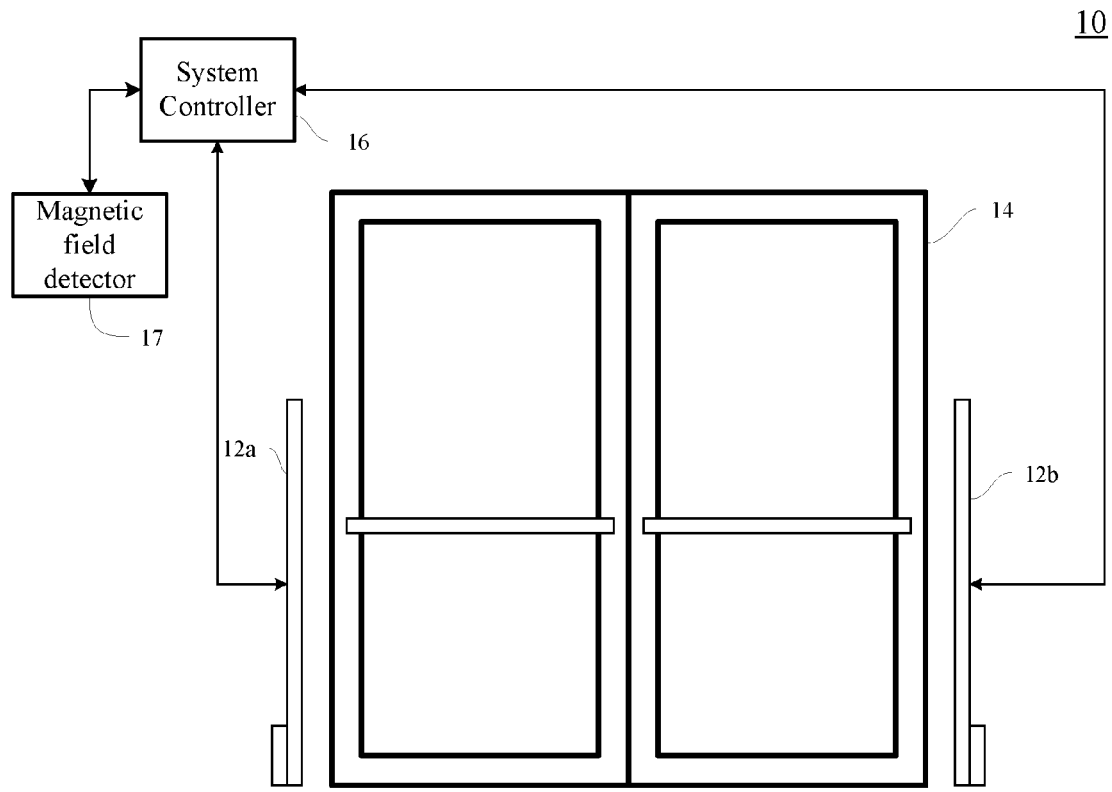
FIG. 1 is a block diagram of an exemplary acoustic electronic article surveillance ("EAS") detection system having integrated metal detection capabilities constructed in accordance with the principles of the present invention.

Before describing in detail exemplary embodiments that are in accordance with the present invention, it is noted that the embodiments reside primarily in combinations of apparatus components and processing steps related to implementing a system and method for cohesively integrating metal detection functionality into an electronic article surveillance ("EAS") system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for detecting metal in an interrogation zone of an EAS system. The EAS system detects the presence of metal using the same hardware used to detect EAS tags.

Referring now to the drawing figures in which like reference designators refer to like elements, there is shown in FIG. 1 one configuration of an exemplary EAS detection system 10 constructed in accordance with the principles of the present invention and located, for example, at a facility entrance. EAS detection system 10 includes a pair of pedestals 12a, 12b (collectively referenced as pedestal 12) on opposite sides of an entrance 14. One or more antennas for the EAS detection system 10 may be included in pedestals 12a and 12b, which are located a known distance apart. The antennas located in the pedestals 12 are electrically coupled to a control system 16 which controls the operation of the EAS detection system 10. The system controller 16 may optionally be electrically connected to a magnetic field detector 17 for more accurately detecting the presence of a foil lined bag. Operation of the magnetic field detector 17 in conjunction with the system controller 16 is discussed in greater detail below.

Figure 2:
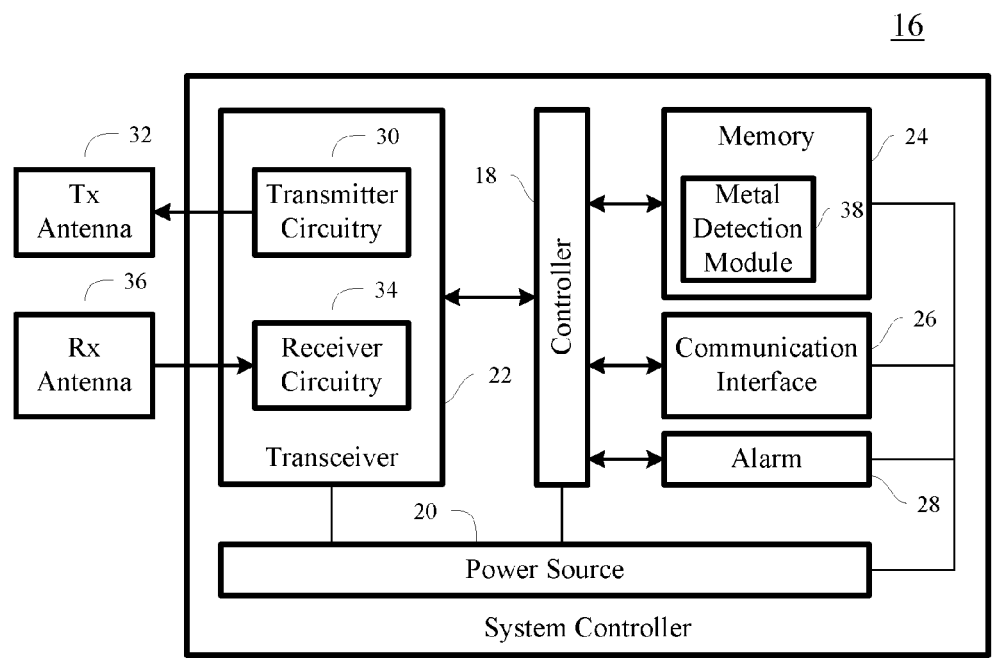
FIG. 2 is a block diagram of an exemplary EAS system controller constructed in accordance with the principles of the present invention.

Referring now to FIG. 2, an exemplary EAS control system may include a controller 18 (e.g., a processor or microprocessor), a power source 20, a transceiver 22, a memory 24 (which may include non-volatile memory, volatile memory, or a combination thereof), a communication interface 26 and an alarm 28. The controller 18 controls radio communications, storage of data to memory 24, communication of stored data to other devices, and activation of the alarm 28. The power source 20, such as a battery or AC power, supplies electricity to the EAS control system 16. The alarm 28 may include software and hardware for providing a visual and/or audible alert in response to detecting an EAS marker and/or metal within an interrogation zone of the EAS system 10.

The transceiver 22 may include a transmitter 30 electrically coupled to one or more transmitting antennas 32 and a receiver 34 electrically coupled to one or more receiving antennas 36. Alternately, a single antenna or pair of antennas may be used as both the transmitting antenna 32 and the receiving antenna 36. The transmitter 30 transmits a radio frequency signal using the transmit antenna 32 to "energize" an EAS marker within the interrogation zone of the EAS system 10. The receiver 34 detects the response signal of the EAS marker using the receive antenna 36.

The memory 24 may include a metal detection module 38 for detecting the presence of metal within the interrogation zone. Operation of the metal detection module 38 is described in greater detail below.

Figure 3:
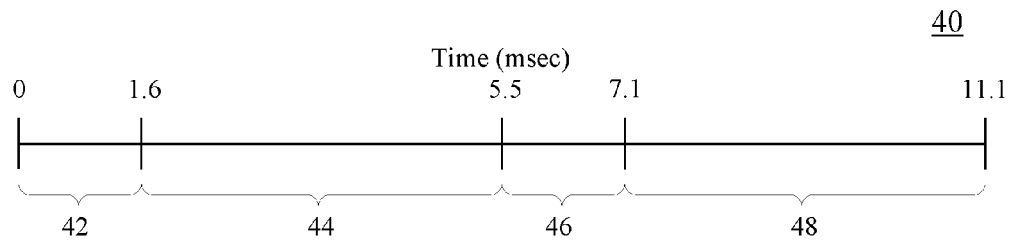
FIG. 3 is a timing diagram illustrating the timing scheme of an acoustic EAS detection system.

Referring now to FIG. 3, a timing diagram for an exemplary detection cycle 40 of one EAS system is shown. Taking advantage of the unique characteristics of the EAS marker, an EAS detection system may transmit a burst during one time period, then "listen" for a response signal at a subsequent time frame during one detection cycle 40. In one embodiment, the EAS detection cycle 40 includes four separate time periods: a transmit window 42, a tag detection window 44, a sync window 46 and a noise window 48. The exemplary detection cycle 40 is 11.1 msec in duration at a frequency of 90 Hz. At the start of the detection cycle 40, a 1.6-millisecond burst of a 58 kHz electromagnetic ("EM") field, i.e. radio frequency signal, is transmitted during the transmit window 42 to "energize" an EAS marker having a natural resonant frequency at the same 58 kHz frequency. At the end of the transmit window 42, the EAS marker has already received and stored an appreciable amount of energy; therefore, the actual EAS marker becomes a source of energy/signal resonating at 58 kHz as its stored energy gradually dissipates (generally known as "ring down"). The transmitted EM field may be several orders of magnitude larger than the EAS marker signal. As a result, the receiver 34 does not operate during transmission. The receiver 34 starts to "listen" for the presence of the EAS marker signal after the transmitter 30 stops transmitting EM energy. During the tag detection window 44, the EAS marker signal can easily be detected as the background is quiet, i.e. the transmitter 30 is off. For verification purposes, the receiver 34 also listens again during the sync window 46 and noise window 48, i.e. 3.9 msec and 5.5 msec, respectively, after completion of the transmission of the EM energy burst. By this time, the energy in the EAS marker should be almost completely dissipated, and cannot be detected. However, if a signal still presents, it may indicate the presence of certain unknown interference source(s) and the alarm 28 will be disabled.

Figure 4:
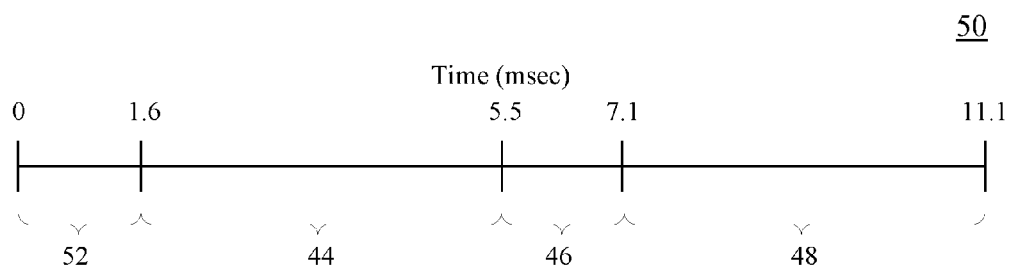
FIG. 4 is a timing diagram illustrating the timing scheme of an acoustic EAS detection system including a hybrid detection window according to the principles of the present invention.

Referring now to FIG. 4, in one embodiment of the present invention, a metal detection cycle 50 includes a metal detection window 52 in place of the transmit window 42. The remainder of the metal detection cycle 50 is the same as the original detection cycle 40, i.e. a tag detection window 44, a sync window 46 and a noise window 48. One method for detecting metal is based on induced eddy current during an EM excitation. The induced eddy current dissipates very quickly, on the order of tens of microseconds in the case of a good conductor. The dissipation is worse with a poor conductor. Even with a good conductor, eddy current dissipation is about two orders of magnitude shorter than that of the acoustic marker.

The EAS detection system 10 resumes marker detection after the termination of the metal detection transmission cycle 50. In this case, the same transmitting EM excitation may be used to detect both the presence of metal and the acoustic EAS marker, as shown in FIG. 4.

Figure 5:
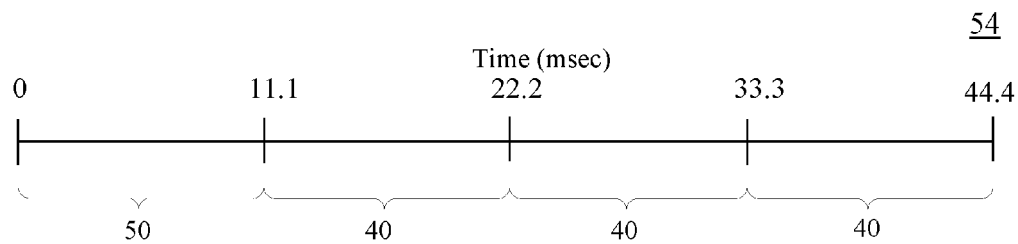
FIG. 5 is a timing diagram illustrating interlacing of hybrid and EAS only windows according to the principles of the present invention.

It is understood that during metal detection, only one pedestal is used as the transmitting pedestal. As a result, the detection during this hybrid cycle may be reduced compared to that in EAS only cycle where both pedestals may be simultaneous transmitting. However, it is possible to mix the different cycles in many ways. For example, a hybrid cycle 54, as shown in FIG. 5, may include one metal detection cycle 50 for every three cycles of EAS only detection cycles 40. It should be noted that the sequence and amount of metal detection cycles 50 interspersed per EAS only detection cycles 40 shown in FIG. 5 are for illustrative purposes only. Any combination and/or order of cycles are within the scope of the present invention.

Figure 6:
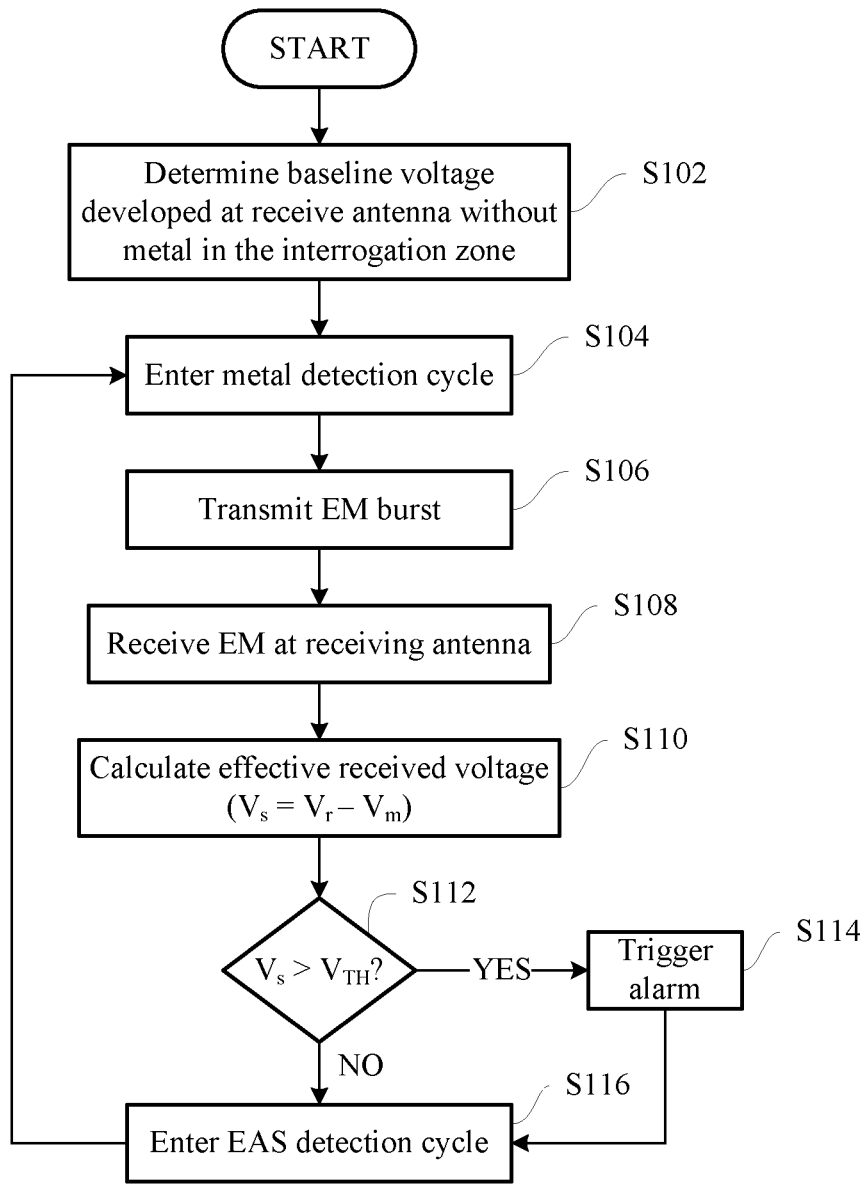
FIG. 6 is a flowchart of an exemplary metal detection process according to the principles of the present invention.

Referring now to FIG. 6, a flowchart is provided that describes exemplary steps performed by the metal detection module 38 and transceiver 22 to detect metal. This method is based on detecting induced eddy current during an EM excitation. One embodiment of the present invention uses only one pedestal for transmitting EM energy while the other pedestal serves as a receiving antenna 36 for metal detection. The metal detection module 38 determines a baseline voltage ($V_r$) developed on the receiving antenna 36 without the presence of metal in the interrogation zone (step S102) by transmitting a burst of EM energy through the transmit antenna 32 and measuring the voltage induced at the receiving antenna 36. During the transmission window 52 of the metal detection cycle 50, the induced voltage ($V_r$) developed on the sense coil in the receiving antenna 36 without the presence of metal is quite large due to the transmitting EM field.

Once the metal detection module 38 has determined the background voltage $V_r$, the system 10 may enter a metal detection cycle 50 (step S104). During the metal detection cycle 50, a burst of EM energy is transmitted through the transmit antenna 32 (step S106) and received at the receiving antenna (step S108). In general, if metal is present in the interrogation zone, the received signal strength due to the eddy current effect is significantly smaller than the direct induction voltage induced during the transmitting EM field. When metal is present, the voltage induced is reduced to a value of $V_m$. The net effective received voltage ($V_s$) due to the presence of metal is calculated as $V_r - V_m$, which is a small fraction (~a few percent) of the $V_r$ (step S110). If $V_s$ is greater than a predetermined threshold voltage ($V_{TH}$) (step S112), then the metal detection module triggers an alarm (step S114). The alarm may be an audible or visual alarm, or may notify a security guard or other authorized personnel of the detection of metal being carried through the EAS detection system 10. The system 10 then enters the EAS acoustic detection cycle 40 for a predetermined number of iterations (step S116) before repeating the metal detection cycle 50 (step S104).

In typical usage, $V_r$ may drift over time an amount even greater than $V_s$. In this case, a hardware/software implementation is required to track such a voltage drift and/or recalibrate the background voltage. A slow change of the drifting $V_s$ may be discarded, and only a fast change is recognized as metal carried through the interrogation zone.

As noted above, the induced eddy current dissipates very quickly, e.g., on the order of tens of microseconds in the case of a good conductor. As a result, the detection during the metal detection cycle 50 may be reduced compared to that in detection cycle 40 for EAS markers only, where both pedestals may be simultaneous transmitting. In this case, the same transmitting EM excitation may be used to detect both the presence of metal and the acoustic EAS marker. Once the metal detection cycle 50 is complete, both pedestals may be used for detecting the acoustic EAS markers.

Figure 7:
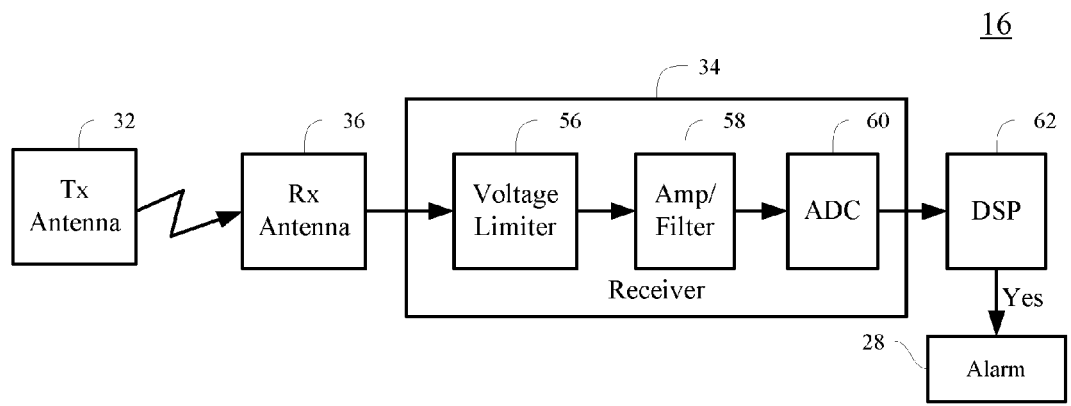
FIG. 7 is a block diagram of an exemplary system controller of an EAS detection system constructed in accordance with the principles of the present invention.

Referring now to FIG. 7, in one embodiment, a "unicoil" design may be used such that the same loop antenna serves as both a transmit antenna 32 and a receive antenna 36 to provide signal transmission and reception. Voltage limiting circuits 56 may be used to protect the receiver 34 electronics, since the antenna is used as a transmitter during the EAS only cycles. The limiting voltage may be set such that it will not clip the received signal, even during the transmitting cycle, while still protecting the receiver circuitry. Secondly, since $V_r$ is substantially large, an amplifier 58 of low gain may be used in conjunction with a filter, thereby reducing the sensitivity of the metal detection system 10. The output of the amp/filter 58 is converted from an analog signal to a digital signal by an analog-to-digital converter ("ADC") 60. The digital signal is then passed to a digital signal processor ("DSP") 62 to determine whether an alarm condition exists, and if so, triggers the alarm 28. It should be noted that the DSP may be integrated into the controller 18 or may be a separate device.

Figure 8:
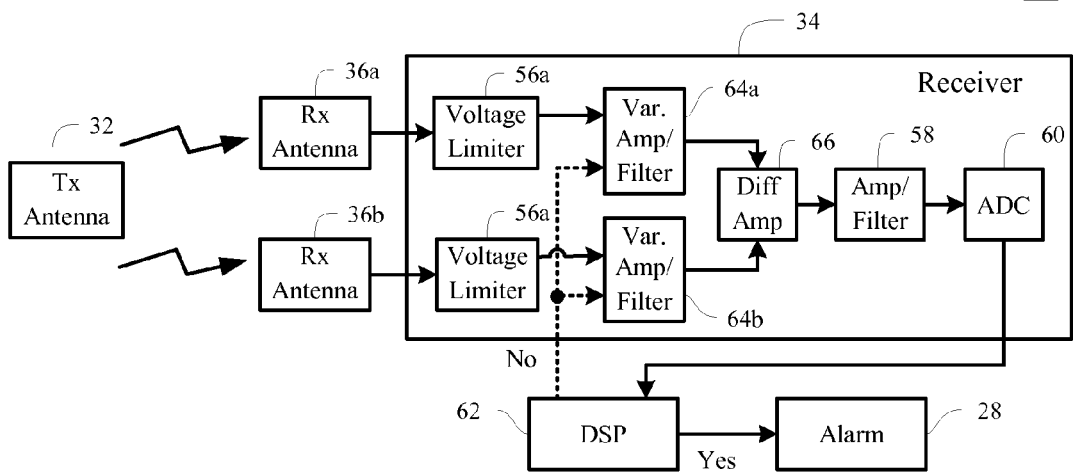
FIG. 8 is a block diagram of an alternative system controller of EAS detection system with integrated metal detection capabilities based on background transmission cancellation, constructed in accordance with the principles of the present invention.

An alternative embodiment of the present invention is provided in FIG. 8. In this embodiment, there may be two separate current loops, i.e. two distinct paths including two receiving antennas 36*a*, 36*b*; two voltage limiters 56*a*, 56*b*, and two variable amplifier/filters 64*a*, 64*b*. The phase of the current in each loop can be controlled independently, e.g., "in phase," "90 degrees," or "180 degrees out of phase," in order to achieve maximum coverage in various different orientations. The metal detection module 38 can take advantage of this specific antenna structure. For example, the two antennas 32 on the transmitting pedestal may transmit in-phase. If the induced voltages on the two receiving antenna 36*a*, 36*b* are fed into a differential amplifier 66, the background transmission effect is minimized. In an ideal case, the net differential voltage can be zeroed, if two coils are placed in a perfect location. In practice, the net signal just needs to be small enough for further signal amplification/conditioning.

The transmitter on one pedestal transmits a 1.6 msec burst of 58 kHz EM field, and the two loops (receiving antennas 36*a*, 36*b*) on the opposing pedestal induce voltages, which are nearly equal since the shape, numbers of windings are the same. The signals are fed into a differential amplifier 66, with a near-zero net voltage. When metal is present, the balance of the two receive paths is broken, therefore a small signal is created at the output of the differential amplifier 66. This signal is then fed through the amplifier/filter 58, digitized by the ADC 58, and processed by the DSP 62 to determine whether a metal is present.

As in the above embodiment, it is possible that a change may take place in the differential amplifier 66 output due to long term system drift, or sudden disturbance of the system configuration. In this case, the alarm 28 may be inhibited, and a command sent to adjust the individual variable gain of each amplifier 64a, 64b to achieve balance.

Figure 9:
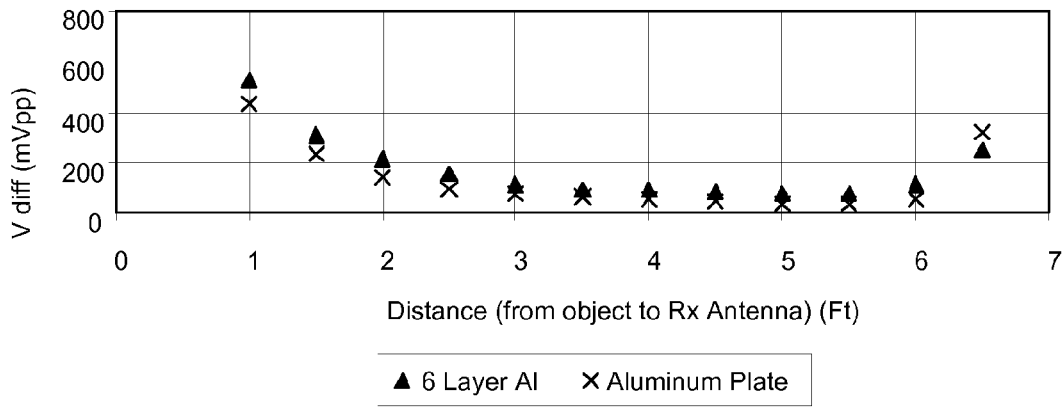
FIG. 9 is a graph illustrating the variance of a detected metal signal versus an object's distance from a receiver in a seven-foot opening system.

Referring now to FIG. 9, a graph is provided which shows the detected signal voltage as a metal object is moved from the receiving antenna 36. The signal strength decreases with increased metal object's distance, reaches a minimum, and increases again as the object approaches the transmitter.

Figure 10:
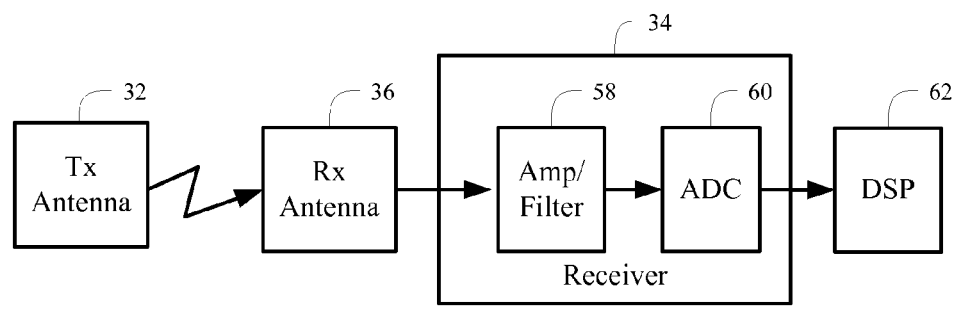
FIG. 10 is a block diagram of an alternative system controller of EAS detection system having integrated metal detection capabilities that uses a receive-only antenna, constructed in accordance with the principles of the present invention.

FIG. 10 illustrates an alternative system controller 16 which uses a receive-only antenna(s) 36 and simplifies the detection mechanism. Separate receive-only antenna(s) 36 can be used for metal detection purpose. The antenna 36 can be an air core loop, or (ferrite) cored antenna, placed at a specific position and angle null to the transmitter. In this example, since this antenna will not be used for transmission purpose, the voltage limiting circuits of the above embodiment can be eliminated. Furthermore, with proper orientation, the antenna 36 may be positioned to minimize the induction due to the transmitted EM field. Without the high background induced voltage, the small voltage detected due to the presence of metal can be amplified with higher gain, therefore providing better sensitivity.

In addition, the present invention may include the detection of a magnet/magnetic material, which provides several significant advantages. For one instance, a magnet can be used to change the magnetic state of an EAS marker by a shoplifter. In another instance, by detecting the magnetic property, the type of metal detected may be differentiated by the system. For example, a regular aluminum foil/metal can be easily distinguished from a shopping cart, which is typically made of magnetic steel. Thus, if the magnetic field detector 17 determines that the metal detected within the interrogation zone is also magnetic, e.g., a shopping cart, the system controller 16 can suppress or refrain from triggering an alarm 28.

To an extreme, a firearm such as handgun is also made with magnetic steel. Therefore, it is possible that the EAS metal detection system 10 of the present invention may provide an initial security check in addition to the anti-shoplifting function.

Conventional high sensitive magnetic sensors such as a fluxgate magnetometer, a giant magnetoresistive sensor, a Gauss meter, or any other magnetic field sensing device may be used for such a magnetic sensing purpose. The magnetometer sensor is a very sensitive device which is capable of detecting magnetic field disturbance due to the presence of a magnet. For reliable execution of such a function, there should be no transmission from the transmission antenna. As a result, magnetic sensing should be performed during the time slot of one of the tag detection window 44, the sync window 46 and the noise window 48, as shown in FIG. 4.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for detecting a metal object and an electronic article surveillance ("EAS") marker, the method comprising:
   establishing an interrogation zone by transmitting only a first signal at only a predetermined frequency, the establishing occurring only during a metal detection window of an EAS/metal detection cycle;
   during the establishing, receiving at least a portion of the first signal at the predetermined frequency;
   detecting a metal object by:
      determining a first voltage of the received portion of the first signal at the predetermined frequency;
      comparing the first voltage to a second voltage; and
      responsive to determining that the first voltage is different from the second voltage by more than a prescribed amount, determining the metal object is present; and
   during an EAS detection window of the EAS/metal detection cycle, wherein the EAS detection window occurs after the metal detection window, detecting an EAS marker response to the transmitting.

2. The method of claim 1, further comprising:
   determining the second voltage when no metal object is in proximity to the interrogation zone.

3. The method of claim 1, wherein responsive to detecting the metal object presence in the interrogation zone, the method further comprises triggering an alarm.

4. The method of claim 3, further comprising:
   determining whether the metal object is magnetic; and
   responsive to determining the metal object is magnetic, suppressing the alarm.

5. The method of claim 1, wherein the first signal is an electromagnetic field at the predetermined frequency.

6. A system for detecting a metal object and an electronic article surveillance ("EAS") marker, the system comprising:
   a transmitter configured to establish an interrogation zone by transmitting only a first signal at only a predetermined frequency, the establishing occurring only during a metal detection window of an EAS/metal detection cycle;
   a receiver configured to receive, during the establishing, at least a portion of the first signal at the predetermined frequency; and
   a metal detector configured to detect a metal object by:
      determining a first voltage of the received portion of the first signal at the predetermined frequency;
      comparing the first voltage to a second voltage; and
      responsive to determining that the first voltage is different from the second voltage by more than a prescribed amount, determining the metal object is present; and
   a controller electrically connected to the transmitter, to the receiver and to the metal detector, the controller configured to detect an EAS marker response to the transmitting during an EAS detection window of the EAS/metal detection cycle, the EAS detection window occurring after the metal detection window.

7. The system of claim 6, wherein the metal detector is further configured to:
   determine the second voltage when no metal object is in proximity to the interrogation zone.

8. The system of claim 6, further comprising an alarm, the metal detector is further configured to trigger the alarm in response to detecting the metal object in the interrogation zone.

9. The system of claim 8, further comprising a magnetic material detector configured to:
   determine whether the metal object is magnetic; and
   responsive to determining the metal object is magnetic, suppress the alarm.

10. The system of claim 6, wherein the metal detection cycle further includes a sync window and noise window.

11. A metal object and electronic article surveillance ("EAS") marker detection system comprising:
   a transmitter configured to establish an interrogation zone by transmitting only a first signal at only a predetermined frequency, the establishing occurring only during a metal detection window of an EAS/metal detection cycle;
   a receiver configured to:
      during the establishing, receive at least a portion of the first signal at the predetermined frequency; and
      during an EAS detection window of the EAS/metal detection cycle, detect an EAS marker response to the transmitting, the EAS detection window occurring after the metal detection window; and
   a metal detector configured to detect a metal object by:
      determining a first voltage of the received portion of the first signal at the predetermined frequency;
      comparing the first voltage to a second voltage; and
      responsive to determining that the first voltage is different from the second voltage by more than a prescribed amount, determining the metal object is present.

12. The system of claim 11, wherein the metal detector is further configured to:
   determine the second voltage when no metal object is in proximity to the interrogation zone.

13. The system of claim 12, further comprising:
   an alarm, wherein the metal detector is further configured to trigger the alarm in response to the detecting of the metal object; and
   a magnetic field detector configured to determine whether the detected metal object is magnetic, and responsive to determining that the metal object is magnetic, the metal detector is further configured to suppress the alarm.

* * * * *